United States Patent
Carr et al.

(10) Patent No.: US 9,883,163 B2
(45) Date of Patent: Jan. 30, 2018

(54) METHOD AND SYSTEM FOR DETERMINING CAMERA PARAMETERS FROM A LONG RANGE GRADIENT BASED ON ALIGNMENT DIFFERENCES IN NON-POINT IMAGE LANDMARKS

(71) Applicant: Disney Enterprises, Inc., Burbank, CA (US)

(72) Inventors: G. Peter K. Carr, Pittsburgh, PA (US); Iain Matthews, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 390 days.

(21) Appl. No.: 13/737,627

(22) Filed: Jan. 9, 2013

(65) Prior Publication Data

US 2013/0176392 A1 Jul. 11, 2013

Related U.S. Application Data

(60) Provisional application No. 61/584,544, filed on Jan. 9, 2012.

(51) Int. Cl.
 *H04N 13/02* (2006.01)
 *G06T 7/80* (2017.01)
(52) U.S. Cl.
 CPC .......... *H04N 13/0207* (2013.01); *G06T 7/85* (2017.01)
(58) Field of Classification Search
 CPC ....... H04N 5/217; H04N 5/232; G06K 9/6211
 See application file for complete search history.

(56) References Cited

U.S. PATENT DOCUMENTS

| | | | |
|---|---|---|---|
| 5,611,000 A * | 3/1997 | Szeliski et al. | 382/294 |
| 6,100,925 A * | 8/2000 | Rosser et al. | 348/169 |
| 6,771,808 B1 * | 8/2004 | Wallack | G06K 9/3216 382/151 |
| 2003/0179922 A1* | 9/2003 | Peters et al. | 382/153 |
| 2011/0052093 A1* | 3/2011 | Porter | 382/284 |
| 2011/0128377 A1* | 6/2011 | Katz et al. | 348/143 |

OTHER PUBLICATIONS

G. Ye, M. Pickering, M. Frater and J. Arnold., "Efficient Multi-Image Registration with Illumination and Lens Distortion Correction" In *ICIP*, 2005.

(Continued)

*Primary Examiner* — Zhubing Ren
(74) *Attorney, Agent, or Firm* — Fay Kaplun & Marcin, LLP

(57) ABSTRACT

A system and method improves a camera calibration. The method includes receiving a camera image, a planar template pattern, a 3D geometry of a surface on which the planar template pattern is embedded, and a set of parameter values. The method includes rendering the planar template pattern into a camera perspective based on the parameter values to generate a warped template image. The method includes generating an error image including at least one non-zero difference between the camera image and the warped template image. The method includes adjusting the parameter values to reduce an error between the camera image and the warped template image.

20 Claims, 6 Drawing Sheets

(56) References Cited

OTHER PUBLICATIONS

Y. Wang, S. Lucey, and J. Cohn, "*Non-Rigid Object Alignment with a Mismatch Template Based on Exhaustive Local Search*", In IEEE *Workshop on Non-rigid Registration and Tracking through Learning*, Oct. 2007.

L. Robert, "*Camera Calibration without Feature Extraction*", CVIU, 63(2):314-325, 1996.

H.S. Hong and M.J. Chung, "*3D Pose and Camera Parameter Tracking Algorithm based on Lucas-Kanade Image Alignment Algorithm*", In *International Conference on Control, Automatic and Systems*, 2007, 4pgs.

G. Thomas, "*Real-time Camera Tracking Using Sports Pitch Markings*", *Real-Time Image Processing*, 2:117-132, 2007, 16pgs.

S. Baker, and I. Matthews, "*Lucas-Kanade 20 years On: A Unifying Framework*", *IJCV*, 56(3): 221-225, 2004, 35 pgs.

\* cited by examiner

METHOD AND SYSTEM FOR DETERMINING CAMERA PARAMETERS FROM A LONG RANGE GRADIENT BASED ON ALIGNMENT DIFFERENCES IN NON-POINT IMAGE LANDMARKS

RELATED APPLICATION

The present application claims priority to U.S. Ser. No. 61/584,544, filed on Jan. 9, 2012, which is incorporated by reference herein.

BACKGROUND INFORMATION

Camera calibration has been done on the basis of point-based targets like checkerboards, but such targets are not practical for outdoor-based cameras, such as those used in outdoor sporting environments. Standard camera calibration algorithms employ a two-stage approach that first identifies point correspondences between geometric features in an image and in the world (e.g., a checkerboard's junction points from its camera's image projection and from the real world positions), and then finds the perspective transformation parameters which minimize the distance between the transformed world points and their corresponding image locations. Checkerboards are perhaps the most popular target because of their ease of use and manufacture, but in large outdoor scenes, checkerboards are impractical, as the necessary size may be on the order of meters. Furthermore, detecting a sufficient number of landmark point features continuously from all camera field-of-views may be challenging given the highly dynamic steering of a broadcast camera (especially when covering a sporting event where camera panning and zooming may be rapid and extreme). What is needed is a camera calibration technique that relies on non-point landmarks in a scene, also known as an image-based alignment. Contrary to a feature-based alignment method, for example, an image-based alignment method aligns non-point landmarks in a reference image with counterpart non-point landmarks in the scene image by warping one image onto the other and estimating the warping function parameters that minimizes the difference between the reference image and the scene image. In general, image-based alignment does not require the step of extracting feature points in the reference and scene images and finding corresponding pairs (as in the feature-based alignment) and allows for accurate matching of the two images. On the other hand image-based alignment requires the two images to be already coarsely aligned via an initialization process, often based on feature-based alignment.

Calibration of a broadcast camera covering a dynamic event such as a football game, may be complicated by the fact that field surface is not planar. A method that takes into account a non-planar surface is needed to calibrate the camera automatically and dynamically as the camera pans and zooms rapidly during the capturing of a live event. Furthermore, an efficient method is needed for the calibration of a spatially coupled set of cameras (e.g., a stereoscopic camera) capturing a live event at a scene including a non-planar surface.

SUMMARY

The present invention relates to a system and method for improving camera calibration. The method comprises receiving a camera image, a planar template pattern, a 3D geometry of a surface on which the planar template pattern is embedded, and a set of parameter values; rendering the planar template pattern into a camera perspective based on the parameter values to generate a warped template image; generating an error image including at least one non-zero difference between the camera image and the warped template image; and adjusting the parameter values to reduce an error between the camera image and the warped template image.

DETAILED DESCRIPTION

Figure 1A:
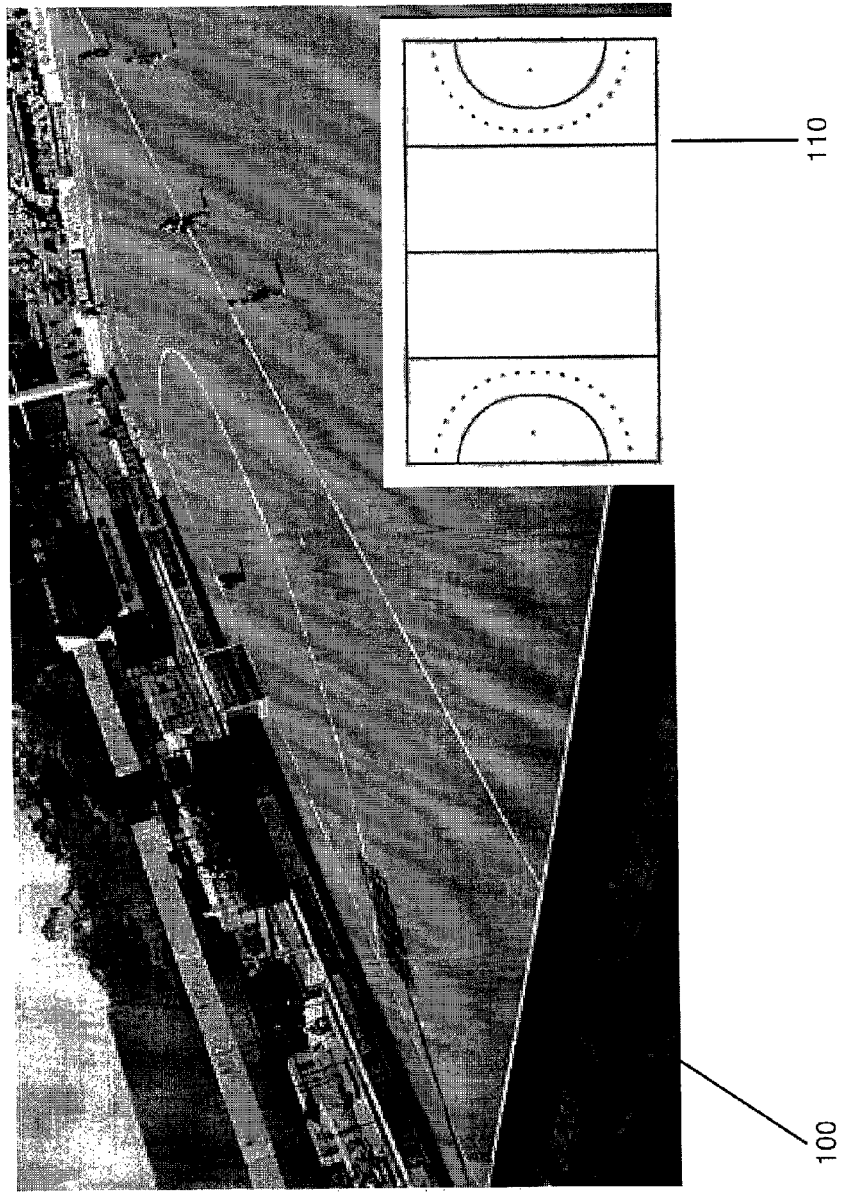
FIG. 1A shows a camera image of a sporting field taken from a particular perspective by a camera and a synthetic, geometric image showing the pitch of the sporting field from an overhead perspective according to an exemplary embodiment of the present invention.

The exemplary embodiments may be further understood with reference to the following description and the appended drawings, wherein like elements are referred to with the same reference numerals. The exemplary embodiments describe methods and systems for calibrating a camera by aligning non-point landmarks in a known reference image to non-point landmarks in an image taken by the camera. More specifically, the calibration in the present application estimates intrinsic, extrinsic, and lens distortion camera parameters by aligning a surface at the scene (e.g. an overhead template/image of the ground) to the surface's image projection as captured by the camera using gradient-based image alignment optimization in which an image warping function is defined. Upon determining an initial set of camera parameters, these may be used for subsequent computations for a non-planar world image calibration by 1) partitioning the reference image into multiple planar patterns (manifolds) and 2) matching the planar patterns to an observed pattern in the camera's image. By aligning the planar patterns to the camera image using gradient-based image alignment optimization, an image warping function that optimizes this alignment may be defined for the non-planar world surface. Since a geometric modeling of the scene (described by detected points, lines, and curves in the camera and/or overhead views) is required only for the initialization step, both the projective and lens parameters are calibrated simultaneously from the planar patterns. Unlike previous image-based calibrations, a reduced camera model is employed that assumes known pixel aspect ratio and principal point. In exemplary embodiments of this invention, the camera parameters may be estimated by aligning two edge images for which a long range gradient is used, hence the two edge images may be aligned without needing exhaustive search or iterative multi-scale refinements. The present invention also relates to determining camera parameters for a pair of cameras (e.g., stereoscopic camera) through calibration of a support such as a three-dimensional rig.

To demonstrate the initialization for the estimate of the world surface to world surface's image homography, FIG. 1 shows a camera image 100 of a sporting field taken from a particular perspective by a camera. Also shown in FIG. 1 is a synthetic, geometric template 110 showing the pitch markings of the sporting field from an overhead perspective (i.e., world surface model). An image of a sporting field from any vantage point can have a corresponding overhead template 110 as a function of the type of sporting field. For example, an image 100 of a field hockey field can be associated with a geometric template 110 containing field hockey markings; an image 100 of a soccer field can be associated with a geometric template 110 containing soccer markings; etc. Because the calibration of the present application is accomplished by comparing a filtered version of the image 100 of an actual scene to a geometric synthetically generated template 110 (as opposed to comparing two images of actual scenes which is avoided using the exemplary embodiments of the present invention), the alignment of the present application avoids the need for supplemental parameters to account for illumination differences that are necessary when performing direct image comparisons. Pitch markings in the image 100 are detected using a color similarity filter with, in the case of the image 100 corresponding to a sports field, additional requirements for thin white objects next to green objects. Because line markings (both straight and curved) predominate in a sporting environment, the amount of landmark point features in such a scene is rare. The feature extraction that characterizes prior camera calibration techniques is impractical for non-point features, due in part to the distortion introduced by wide-angle lenses prevalently used in the imaging of sporting events, and/or non-flat curvature of the playing surface.

The exemplary embodiments of the present invention may utilize a variety of different ways to determine estimates of the camera parameters. Image-based calibration may be used in which the camera parameter estimates are performed directly from pixel intensities (representing the thin white lines, green regions, etc.). A model of the scene including its appearance and geometry is required such as the template 110. Camera parameters p may be estimated by minimizing the difference between a rendered template of the scene and a filtered version of the camera image (e.g., image 100). Thus, a refinement process may be used in which iterations of the estimations are used to minimize the difference.

To avoid accounting for additional parameters, an alignment is performed to a geometric template image T that defines the locations of the visual ground surface features. The ground surface may be planar or may be consisted of multiple planes approximating a curved surface. As discussed above, the geometric template image T may be an overhead view of the sporting field such as the template 110. For a given set of camera parameters p, a greyscale image may be generated by indicating the portion of each camera pixel m'=(u, v) that overlaps with feature locations m in T. This is equivalent to warping the overhead image T into the camera's perspective $\hat{T}=T(W(m';p))$, where the warp m=W(m';p) is determined by the current projective and lens aspects parameters of the camera in an iterative process (as will be discussed in further detail below). Those skilled in the art will understand that the exemplary embodiments of the present invention utilize a reverse operation as usually performed conventionally. That is, the exemplary embodiments of the present invention warp the template T, and not the camera's image. Specifically, for each image pixel location m', W(m';p) yields a corresponding location m at the template space T from which a template's value is interpolated and mapped onto location m' in $\hat{T}$. Then, the warped template $\hat{T}$ is compared with image I. Where image I indicates the likelihood each pixel within the camera's image corresponds to a visual world feature and typically is a filtered version of the camera image 100. Next, an optimal set of camera parameters p* may be determined by minimizing a distance between $\hat{T}$ and I. This distance may be an image plane distance defined as the geometric distance between a non-zero pixel in $\hat{T}$ and the closest non-zero pixel to it in I (e.g., in a substantially similar manner as point-based calibration minimizes projection error). The closest detected pixel in the image I for a given pixel in $\hat{T}$ may change from one iteration to the next.

Although image plane distance is the appropriate error measure to minimize, the difference between each pixel value of the warped overhead image $\hat{T}$ and each corresponding pixel value of the image I is nearly equivalent, thereby making it a solvable optimization problem. Accordingly, a gradient-based image alignment may be performed. Specifically, a forwards additive Lucas-Kanade algorithm may be used to estimate an optimal set of the camera parameters p* through an iterative process.

1. Warp T with W(m';p) to compute image $\hat{T}$
2. Compute error image $E=I-\hat{T}$
3. Warp gradient $\nabla T$ with W(m';p) resulting in $\nabla \hat{T}$
4. Evaluate Jacobian $$\frac{\partial W}{\partial p}$$

at (m'; p)

5. Compute steepest descent $$\nabla \hat{T} \frac{\partial W}{\partial p}$$

6. Compute Hessian $$H = \Sigma_{m'} \left[ \nabla \hat{T} \frac{\partial W}{\partial p} \right]^T \left[ \nabla \hat{T} \frac{\partial W}{\partial p} \right]$$

7. Compute $$\Delta p = H^{-1} \Sigma_{m'} \left[ \nabla \hat{T} \frac{\partial W}{\partial p} \right]^T E(m')$$

8. Update $p \leftarrow p + \Delta p$

Thus, using the above steps in which the updated camera parameters p from step 8 are used to repeat steps 1-7, the optimal camera parameters p* may be determined.

An error image is an image created by comparing the camera image with a template image to determine an error between the two images. In the embodiment described above, for the error image E of step 2, the error image E is a comparison between image I and the warped template image T̂. As shown in FIG. 1C, a combined image 150 may be a camera image I in which a warped template image T̂ is superimposed thereon. To illustrate the error image E, a portion 150' of the combined image 150 may be used. As shown, the camera image I has a field marking in which the superimposed warped template image T̂ does not exactly overlay. Using a gray scale conversion as discussed above, the error image E may be determined. As shown, the error image 160 may be a result of a difference between the camera image I and the warped template image T̂. Through the iterative process discussed above, the magnitude of an error of the error image E may be reduced such that the optimal camera parameters p* are determined.

It should be noted that the above iterative process is only one exemplary embodiment in which the optimal camera parameters p* are determined. Those skilled in the art will understand that the steps of the iterative process may be changed, rearranged, etc. For example, steps 3-7 of the above iterative process may include different calculations to determine the adjustment to the camera parameters.

Gradient-based image alignment optimizations may be difficult because the occurrence of strong edges within an image is relatively rare compared to the number of pixels since the gradient of an edge filter is effectively non-zero in only a small number of locations. Accordingly, a gradient-based optimizer receives little information about how to modify the current parameters to reach a better solution in this situation. That is, the value of Δp as determined in step 7 above may not be properly determined. A successful update of parameter values requires non-zero gradient locations within an edge image to coincide with non-zero alignment differences between I and T̂. In practice, the images I, T̂ and its gradient are all sparse.

Thus, when point-based features are not present in the scene (e.g., image 100), aligning edge images using the gradient-based optimization is quite difficult as the images and gradients are sparse, resulting in a narrow convergence range. According to the exemplary embodiments of the present invention, a long range gradient may be used to overcome this limitation.

The refinement process to estimate the camera parameters may be performed with the long range gradient. To overcome the narrow convergence range of an edge image, a gradient is computed on template T 110 at location m of image 100 by fitting a plane to pixel intensities contained within a $(2n+1) \times (2n+1)$ window centered at location m. The gradient for location m is given by $\nabla T(m) = [A, B]^T$, where the parameters $[A, B, C]^T$ of the fitted plane are computed by solving the over-determined system of equations:

$$\begin{bmatrix} -n & -n & 1 \\ -n+1 & -n & 1 \\ & \vdots & \end{bmatrix} \begin{bmatrix} A \\ B \\ C \end{bmatrix} = \begin{bmatrix} T(m_x - n, m_y - n) \\ T(m_x - n + 1, m_y - n) \\ \vdots \end{bmatrix}$$

Figure 2:
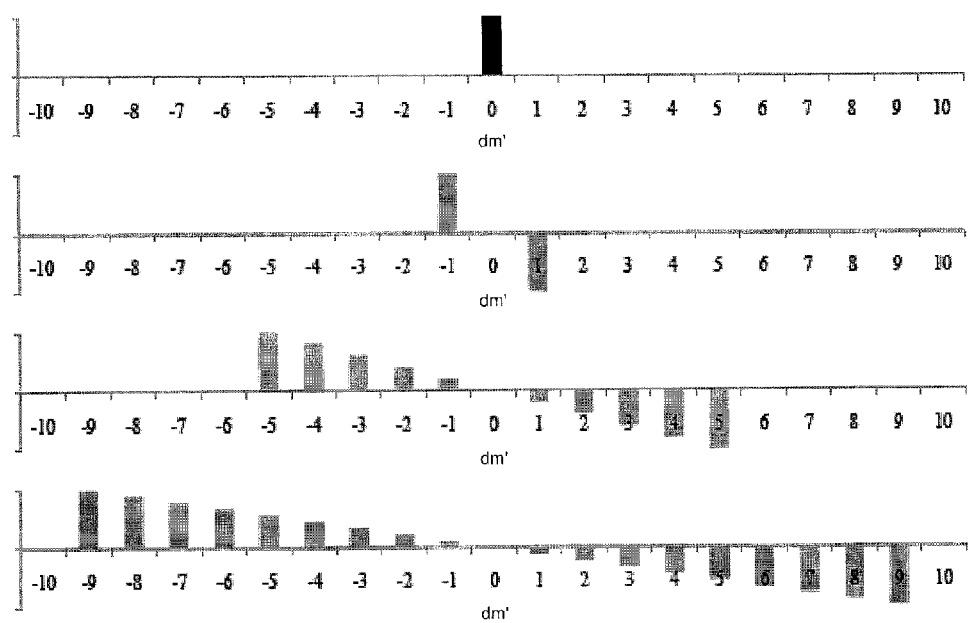
FIG. 2 shows exemplary representations of gradient window sizes for n=1, 5, and 9 according to an exemplary embodiment of the present invention.

Fitting parametric models to image intensities is a standard technique for estimating more precise measurements. Here, a large window size is used to propagate information. In the case of an edge image, approximating the gradient at m by fitting a plane to the nearby intensities is roughly equivalent to a signed distance transform. For example, consider the cross-section of a one-pixel wide binary edge response. FIG. 2 shows representations of gradient window sizes for n=1, 5, and 9. Each gradient response in FIG. 2 has been normalized relative to its maximum height. The response for a window size of n=1 is identical to that of a 3×3 Sobel filter. As shown, for various half-window sizes n, the gradient increases linearly with the distance from m up to its maximum (which occurs at −n). The sign of the gradient indicates the direction towards the center location m.

The gradient at distances sufficiently far from m, i.e. greater than n, is zero. This behavior preserves the intrinsic robustness of matching edge images (such as I and T̂). Suppose the current parameters p warp a feature (e.g. a pitch marking) located at m=W(m';p) in T to location m' in I (e.g., the image 100). If m' is further than n pixels from the true location m'* of the corresponding feature in I, then the non-zero image differences from this misalignment will not contribute to the change in the camera parameters Δp, as the gradients (and therefore the steepest descents) at m' and m'* will be zero as shown in FIG. 2. Equivalently, Δp is only computed from non-zero differences and gradients which are sufficiently close to corresponding features in image I (e.g., image 100). The variable n, which is a measure of the window size for the gradient and is expressed as a pixel distance relative to a pixel at center location m in the camera image, is chosen to be large and is thus referred to as a long range gradient. For example, n can be chosen to have a value of 8, which in the example of FIG. 1 corresponds to a physical window size of 0.85 m. To improve the results of this alignment process, a sequence of long range gradient operations can be performed, in contracting fashion. That is, the initial gradient may be based on a large window size, and each subsequent iteration may be based on a successively smaller value.

The size of the window used for computing long range gradients plays a role in the quality and speed of the optimization process. In FIG. 1, the overhead view of the pitch markings was rendered at 1 pixel=0.05 m, making one pixel slightly smaller than the width of most pitch markings. Since a value for n exists that optimizes the window size, a value that is too small will prevent the optimization process from reaching parameters that are far from the initialization, and a value that is too large will prevent small refinements to the parameters from being made.

Image pyramids are often used to minimize the necessity of an optimal window size. A pyramid using 3×3 Sobel gradients was generally able to match the precision of a single long range gradient (although after many more iterations). However, like a pyramid, a sequence of contracting long range gradients can similarly reduce the need for an optimal window size. Contracting long range gradients generally produced the best alignment, presumably because contracting long range gradients always use the original data (whereas a pyramid uses down sampled versions). In addition to minimizing the impact of non-optimal window sizes, image pyramids also provide robustness against poor initializations.

The image alignment technique discussed herein for camera calibration is useful when point-based features are not present in the scene. In the majority of images captured outdoors and at sports fields, the dominant visual feature is an edge. Accordingly, the long range gradient may be used as discussed above. It should be noted that the long range gradient may relate to the number of pixels used in the computation or size of the window. Conventional methods for computing image gradients use a 3×3 window. Thus, the long range gradient of the exemplary embodiments may essentially be for any window size greater than a 3×3.

For added robustness, multiple long range gradients may be employed in a sequential fashion to perform a coarse to fine alignment (when the initialization is far from the solution). The initialization being far from the solution may relate to the initial parameter estimate being significantly inaccurate such that the optimizer has to travel a large distance in parameter space before arriving at a best possible solution. A poor parameter estimate will therefore lead to misalignment between the detected edges in the image and the rendered/warped template. For additional robustness, square pixels and a known principal point may be assumed. This is extremely beneficial when calibrating from planes, as the projective parameters are overdetermined.

The exemplary embodiments of the present invention may derive an image warping function and its Jacobian from a projection model including lens distortion. In addition, formulating calibration in terms of image alignment permits the use of arbitrary geometric patterns for calibration as described in further detail below.

Figure 1B:
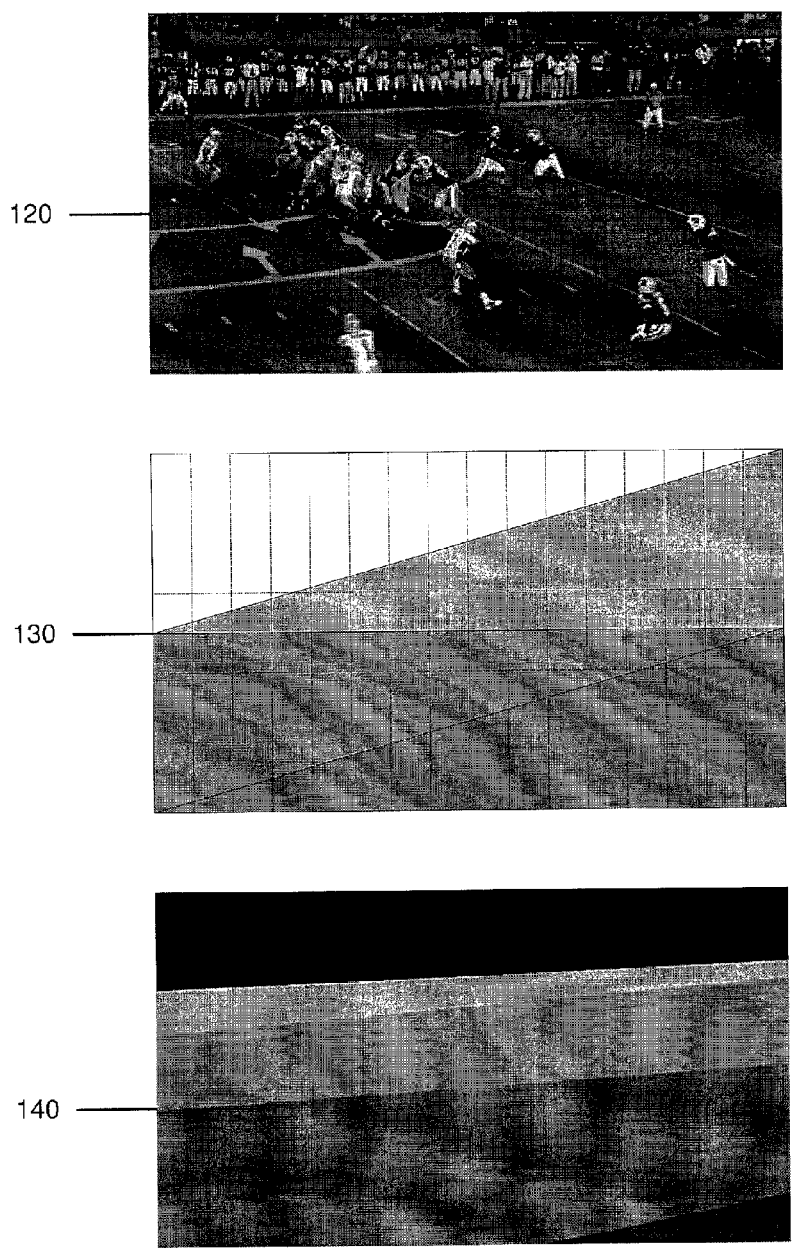
FIG. 1B shows a sporting field, a planar pattern, and a rendering therebetween according to an exemplary embodiment of the present invention.
Figure 1C:
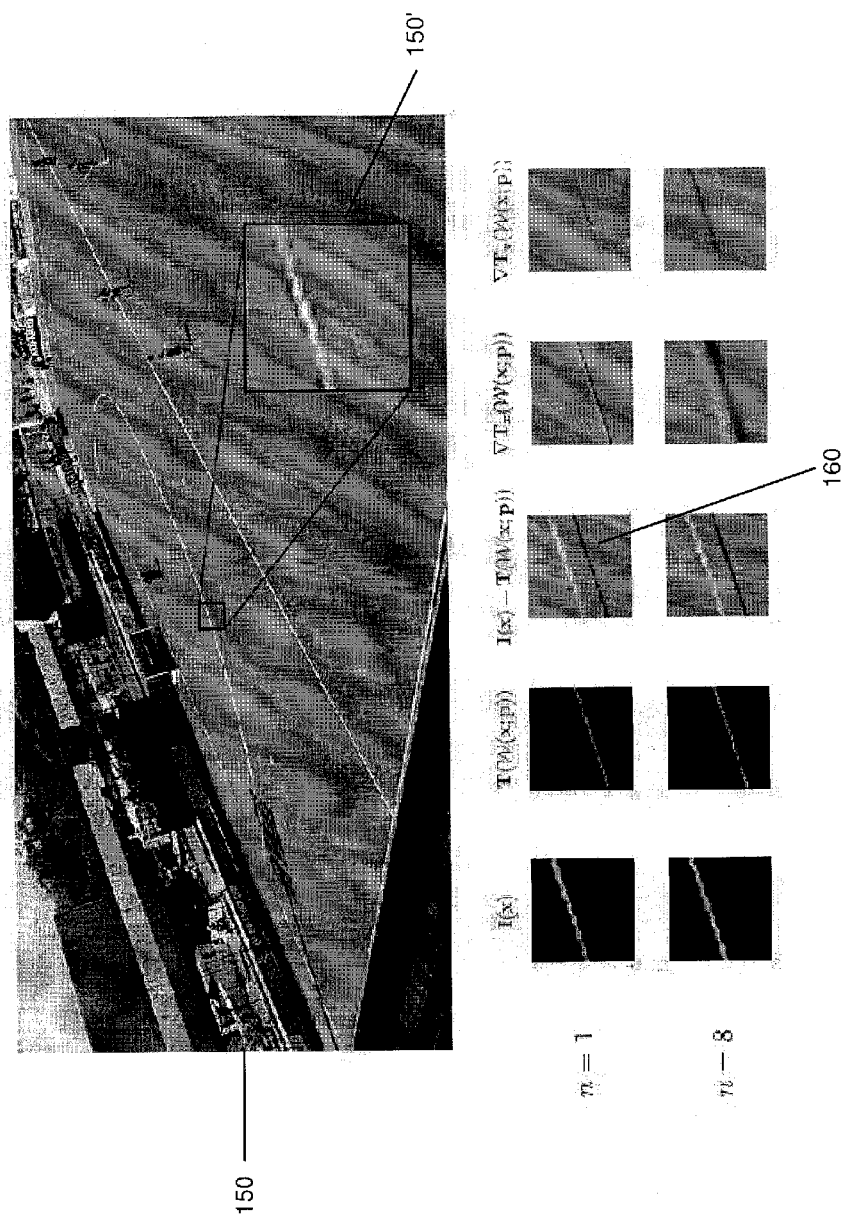
FIG. 1C shows a camera image with a geometric image superimposed and a resulting error image according to an exemplary embodiment of the present invention.

As illustrated in FIG. 1B, when a non-planar world surface is concerned, a planar pattern 130 may be matched to the image of a non-planar world surface of the sporting field 120 by accounting for the 3D geometry S of the embedded 2D manifold of the playing surface. In a specific example and, as will be described in further detail below, the manifold structure of the planar pattern 130 may include four triangles. An image 120 of the sporting field from any perspective can be matched with the planar pattern 130. A preliminary computation performed is to match the planar pattern 130 on the world manifold to an observed pattern in the camera's image plane (e.g., image 120). An initial set of camera parameters may be estimated from an initial comparison of the camera image 100 to the template image 110 as well as an initial matching of the planar pattern 130 to the image 120.

In a specific exemplary embodiment, the manifold 130 uses four triangles that approximate the surface of the playing field using a constant triangular cross-sectional profile. Those skilled in the art will understand that the use of four triangles is only exemplary. For example, if a more precise model is to be used, a manifold utilizing more triangles may be used.

When the manifold is planar, the mapping m'→m necessary for computing the warped template is described by a homography. However, if the underlying structure S($\cdot$) is not planar, it is impossible to compute the mapping m'→m in general. For example, the back projected ray associated with m' may intersect a non-planar shape (e.g., a sphere, a cylinder, etc.) in more than one location. However, if the manifold is approximated as a mesh of N planar patches (e.g., four triangles in the case of planar pattern 130), any patch represents an arbitrary plane in the world for which the mapping m'→m exists. The back projected ray will have a unique intersection with the manifold, where the unique intersection is the closest point of the N possible solutions (one for each planar patch) to the camera center. As a result, the mapping m'→m will exist for 3D world surfaces described using a planar mesh.

In practice, the planar template embedded on a non-planar surface is warped into the image using N planar warping functions, where the warp associated with an $n^{th}$ triangle is noted as $W_n$(m';p). The triangles of the manifold are rendered in the camera's perspective 140. A closest triangle is then computed for each pixel in the camera image 100. Specifically, the most appropriate triangle is determined by both pixel location and current camera parameters. As will be described in further detail below, a pixel is defined with coordinates m'=[u,v] in the image plane (e.g., camera image 120) and a point with coordinates m=[i,j] is defined for a location on a two-dimensional manifold of a three-dimensional shape (with corresponding 3D position M=[X,Y,Z]). The structure of the non-planar surface of the pitch is assumed to be known and defined by a function S that associates a three-dimensional location to any location on the manifold M=S(m).

The exemplary embodiments of the present invention may further define the warping function of the gradient-based image alignment optimization. Lens distorted projective geometry is usually characterized by considering a point m in the world mapped to a location m' in an image plane by a camera projection P($\cdot$) (or a homography H($\cdot$) for planar geometry) followed by a lens distortion L($\cdot$). Thus, m' may be defined with coordinates in the image plane as m'=(u,v) while m may be defined with coordinates at a location in the two-dimensional manifold of a three dimensional shape as m=(i,j) where (X,Y,Z) equivalent to (i,j) and generally i≠X and j≠Y. The non-planar world surface may also be assumed to be defined with a function S($\cdot$) which associates a three dimensional location M=S(m) to any location m on the manifold. This definition allows a visualization of the camera's detected features registered to an overhead view as the reverse mapping is used to compute a warped image. Alignment in this domain would minimize the distance between locations of back-projected markings and expected positions thereof. However, the more common oblique camera angle makes back-projection errors of distant features much more apparent than close ones. As a result, optimized parameters may give good alignment in the overhead domain but not when projected into the camera image. Minimizing the projection error (instead of the back-projection error) requires the warp to be defined in the opposite direction. Therefore, according to a preferred exemplary embodiment of the present invention, it is assumed that the calibration pattern exists on an arbitrary world surface described by the structure function S, so the mapping of m→m' is:

$$m' = PS(m) \quad \text{(Equation 1)}$$

$$\begin{bmatrix} u \\ v \\ w \end{bmatrix} = PS\left(\begin{bmatrix} i \\ j \\ 1 \end{bmatrix}\right)$$

For a lens distortion model, a couple of assumptions may be made for simplicity. First, the lens effects being radially symmetric with respect to a distortion center e may be assumed and second, the amount of distortion ($\lambda$) at a particular point within the image depends only on the radial distance may be assumed. The direction of L (i.e., whether it distorts or undistorts) is arbitrary. For convenience, the lens may be defined as undistorting and for consistency, denote the lens warp as $L^{-1}$ (m'):

$$\hat{m}'=L^{-1}(m')$$

$$\hat{m}'=e+\lambda(r)(m'-e) \quad \text{(Equation 2)}$$

Where r=∥m'−e∥ and m' and $\hat{m}'$ and are distorted and undistorted locations in the camera's image plane.

Since $\lambda(r)$ is an arbitrary function of r>0, the distortion function is parameterized as a Taylor expansion:

$$\lambda(r)=1+\kappa_1 r+\kappa_2 r^2+\kappa_3 r^3+ \ldots +\kappa_n r^n \quad \text{(Equation 3)}$$

The center of distortion e may be fixed at the center of the image which means that the lens is parameterized by n lens coefficients:

$$p_L{}^{-1}=[\kappa_1,\kappa_2,\ldots,\kappa_n] \quad \text{(Equation 4)}$$

It is noted that only a single lens coefficient is employed, either $\kappa_1$ or $\kappa_2$ with $\kappa_1 \equiv 0$ for compatibility with other lens models. It is also noted that other lens models such as the rational polynomial expansion may be employed. The only restriction is that the lens model is parametrizable and is differentiable. Thus, Equation 4 may be used to determine the lens distortion parameter of the camera.

For a camera projection model, the exemplary embodiments of the present invention may assume some of the intrinsic parameters among the eleven degrees of freedom for a perspective camera matrix $P=KR[I|-C]$. For example, a natural camera assumes zero skew and known pixel aspect ratio (typically unity). For simplicity, the principal point may be assumed to coincide with the center of the image. Therefore, K has only one degree of freedom (i.e., the focal length f) and P has only seven (as there are an additional six to describe 3D position and orientation). Accordingly, the intrinsic parameters of the camera may be defined with K while the extrinsic parameters of the camera may be defined with $R[I|-C]$. It is noted that the projection matrix $P=KR[I|-C]$ has a parameterization that includes completely independent parameters, thereby making the optimization much easier to determine. However, an alternative decomposition may be used in which $P=K[Rt]$ where $t=-RC$. This form may be less ideal for optimization as the parameters representing "t" are coupled to the parameters representing "R".

If the world coordinate system is defined such that $Z=0$ corresponds to the ground plane, the ground to image homography H may be extracted from the first, second, and fourth columns of the camera projection matrix P (up to a scalar uncertainty).

$$\hat{m}' = P[x_x' \, x_y' \, 0 \, 1]^T$$

$$\hat{m}' \cong KR[I|-C][x_x' \, x_y' \, 0 \, 1]$$

$$\hat{m}' = Hm \quad \text{(Equation 5)}$$

Where $$H \cong KR \begin{bmatrix} 1 & 0 & -C_x \\ 0 & 1 & -C_y \\ 0 & 0 & -C_z \end{bmatrix} \quad \text{(Equation 6)}$$

And $$x' = H^{-1}\hat{x} \quad \text{(Equation 7)}$$

The rotation matrix R describes the camera's orientation with respect to the world coordinate system and accordingly has three degrees of freedom. There are many ways to parameterize R such as the Rodrigues axis-angle notation $\omega = [\omega_x, \omega_y, \omega_z]$ which describes R as a rotation of $\|\omega\|$ radians about axis $\omega$. Therefore, the projective component of $W(\cdot)$ is parameterized by seven elements:

$$p_H = [f, C_x, C_y, C_z, \omega_x, \omega_y, \omega_z] \quad \text{(Equation 8)}$$

Those skilled in the art will understand that this results in less elements than a ground to image plane homography of a general projective camera. Accordingly, a reduced camera model may be used for determining the estimates of the camera parameters.

As discussed above, an estimate of the ground to image homography may be used for initialization. The warping function discussed above may therefore be used as a first step of the calibration algorithm to define the warping function used to determine the estimates of the camera parameters, in particular the intrinsic, extrinsic, and lens distortion parameters. When aligning one image (e.g., camera image 100) to another image (e.g., template 110), a homograph is a common transform to be used but a more restricted model (e.g., translation only) may be appropriate depending on the circumstances. A general projective camera may be defined by 11 parameters (i.e., 3 for position, 3 for orientation, 1 for focal length, 2 for principal point, 1 for pixel aspect ratio, and 1 for pixel skew). A homography may be extracted from a projection matrix but not the reverse (unless assumptions about the camera are made such as square pixels and known principal point).

According to the exemplary embodiments of the present invention, the camera may be calibrated by determining the homography that best aligns the template 110 to the image 100. Subsequently, extracting the set of camera parameters p may generate such a homography. Because of noise in the camera image 100, it is possible that the set of extracted camera parameters may not be realistic (e.g., specifying non-square pixels when the image sensor is known to have square pixels). Consequently, it is preferable to optimize in the parameter space of the camera and not the arbitrary parameter space of the homography as this guarantees a realistic set of camera parameters at the end.

In order to compute the inverse mapping, the individual mapping (of the N possibilities) to use at each pixel location in the image plane must be obtained. The appropriate triangle is determined by both pixel location $m'=(u,v)$ and the current camera parameters p such that $n(m';p)$. Using the current hypothesis of camera parameters p, n may be computed at each pixel location m' by projecting the surface shape structure into the image and using a z-buffering technique of computer graphics to determine a visible triangle at each pixel location such as the Z-buffer 140. Accordingly, Equation 1 may be revised as the following: $m = W_{n(m';p)}(m';p)$. For clarity, the parameters of n are omitted and the description below focuses on an analytic formulation $W_n(m';p)$ for a given set of camera parameters p and an arbitrary world plane.

As described above, instead of the $Z=0$ ground plane, an arbitrary world plane $\pi$ described by the equation $a_\pi X + b_\pi Y + c_\pi Z + d_\pi = 0$ is considered. Much like the XY plane, a two-dimensional location m on the plane may be described using unit vectors $\hat{i}_\pi$ and $\hat{j}_\pi$. The local unit vectors are related to the world coordinate system based on the plane's normal $\hat{n}_\pi[a,b,c]^T$. Thus, the following sets of equations may be derived.

$$\hat{i}_\pi = \hat{Y} \times \hat{n}_\pi$$

$$\hat{j}_\pi = \hat{n}_\pi \times \hat{X}$$

A three-dimensional point M may be associated to any two-dimensional location m on $\pi$ using a 4×3 matrix $Q_\pi$.

$$M = Q_\pi m$$

$$\begin{bmatrix} X \\ Y \\ Z \\ 1 \end{bmatrix} = \begin{bmatrix} \hat{i}_X & \hat{j}_X & 0 \\ \hat{i}_Y & \hat{j}_Y & 0 \\ \hat{i}_Z & \hat{j}_Z & -\frac{d}{c} \\ 0 & 0 & 1 \end{bmatrix} \begin{bmatrix} i \\ j \\ 1 \end{bmatrix}$$

When the world surface is planar (and arbitrarily defined as the $Z=0$ plane), the corresponding matrix $Q_\pi$ is $$Q_\pi = \begin{bmatrix} 1 & 0 & 0 \\ 0 & 1 & 0 \\ 0 & 0 & 0 \\ 0 & 0 & 1 \end{bmatrix}$$

Substituting the above expression for M as a function of 2D manifold coordinates m into the camera projection equations leads to a homography between the image plane and the arbitrary world plane $\pi$.

$$m' = PM$$

$$m' = KR[I|-C]M$$

$$m' = M[I|-C]Q_\pi \begin{bmatrix} i \\ j \\ 1 \end{bmatrix}$$

$$m' = M \begin{bmatrix} \hat{i}_X & \hat{j}_X & -C_X \\ \hat{i}_Y & \hat{j}_Y & -C_Y \\ \hat{i}_Z & \hat{j}_Z & -C_Z - \frac{d}{c} \end{bmatrix} \begin{bmatrix} i \\ j \\ 1 \end{bmatrix}$$

$$m' = \begin{bmatrix} M_{00}\hat{i}_X + M_{01}\hat{i}_Y + & M_{00}\hat{j}_X + M_{01}\hat{j}_Y + & -M_{00}C_X - M_{01}C_Y - \\ M_{02}\hat{i}_Z & M_{02}\hat{j}_Z & M_{02}\left(C_Z + \frac{d}{c}\right) \\ M_{10}\hat{i}_X + M_{10}\hat{i}_Y + & M_{10}\hat{j}_X + M_{11}\hat{j}_Y + & -M_{10}C_X - M_{11}C_Y - \\ M_{12}\hat{i}_Z & M_{12}\hat{j}_Z & M_{12}\left(C_Z + \frac{d}{c}\right) \\ M_{20}\hat{i}_X + M_{21}\hat{i}_Y + & M_{20}\hat{j}_X + M_{21}\hat{j}_Y + & -M_{20}C_X - M_{21}C_Y - \\ M_{22}\hat{i}_Z & M_{22}\hat{j}_Z & M_{22}\left(C_Z + \frac{d}{c}\right) \end{bmatrix} \begin{bmatrix} i \\ j \\ 1 \end{bmatrix}$$

$$m' = H_\pi m$$

The Jacobian of the warp may be computed by considering the derivative of the i and j components with respect to an arbitrary parameter p. The outermost operation is the conversion from homogeneous components. The derivative of this operation is governed by the quotient rule.

$$\frac{\partial W_i}{\partial p} = \frac{\frac{\partial i}{\partial p}k - \frac{\partial k}{\partial p}i}{k^2} \quad \text{(Equation 9)}$$

$$\frac{\partial W_j}{\partial p} = \frac{\frac{\partial j}{\partial p}k - \frac{\partial k}{\partial p}j}{k^2} \quad \text{(Equation 10)}$$

For clarity, the lens distortion function is neglected and an ideal image point $\hat{m}'=[u,v,w]^T$ is assumed. Accordingly, the partial derivative expressions of Equations 9 and 10 are the following:

$$\frac{\partial i}{\partial p} = \frac{\partial H_{00}^{-1}}{\partial p}u + \frac{\partial H_{01}^{-1}}{\partial p}v + \frac{\partial H_{02}^{-1}}{\partial p}w \quad \text{(Equation 11)}$$

$$\frac{\partial j}{\partial p} = \frac{\partial H_{10}^{-1}}{\partial p}u + \frac{\partial H_{11}^{-1}}{\partial p}v + \frac{\partial H_{12}^{-1}}{\partial p}w \quad \text{(Equation 12)}$$

$$\frac{\partial k}{\partial p} = \frac{\partial H_{20}^{-1}}{\partial p}u + \frac{\partial H_{21}^{-1}}{\partial p}v + \frac{\partial H_{22}^{-1}}{\partial p}w \quad \text{(Equation 13)}$$

where H is a homography to an arbitrary world plane (either the ground plane or a triangle in a planar mesh).

To compute the derivative of $H^{-1}$, an intermediate expression G may be introduced which relates to the elements $H^{-1}$ and H:

$$G \equiv (\det H)(H^{-1})$$

$$G \equiv \begin{bmatrix} H_{11}H_{22} - H_{12}H_{21} & H_{02}H_{21} - H_{01}H_{22} & H_{01}H_{12} - H_{02}H_{11} \\ H_{12}H_{20} - H_{10}H_{22} & H_{00}H_{22} - H_{02}H_{20} & H_{02}H_{10} - H_{00}H_{12} \\ H_{10}H_{21} - H_{11}H_{20} & H_{01}H_{20} - H_{00}H_{21} & H_{00}H_{11} - H_{01}H_{10} \end{bmatrix}$$

where $\det H = H_{00}(H_{11}H_{22} - H_{12}H_{21}) - H_{10}(H_{01}H_{22} - H_{21}H_{02}) + H_{20}(H_{12}H_{01} - H_{11}H_{02})$.

The partial derivative expressions in Equations 11 and 13 may be computed. The partial derivative of an arbitrary element $H_{..}^{-1}$ of $H^{-1}$ with respect to parameter p may be determined with the following:

$$\frac{\partial H_{..}^{-1}}{\partial p} = \frac{\frac{\partial G_{..}}{\partial p}\det H - G_{..}\frac{\partial \det H}{\partial p}}{(\det H)^2} \quad \text{(Equation 14)}$$

Equation 14 includes partial derivatives of both G and det H, which involve the product rule and partial derivatives $$\frac{\partial H_{..}}{\partial p}.$$

The expressions for $$\frac{\partial G_{..}}{\partial p} \text{ and } \frac{\partial \det H}{\partial p}$$

are omitted and proceed the expressions for $$\frac{\partial H_{..}}{\partial p}.$$

The computation for $$\frac{\partial H_{..}}{\partial p}$$

involves multiplications of $D_{..}$ with the X, Y, and Z components of either $\hat{i}$ and $\hat{j}$. The values of $\hat{i}$ and $\hat{j}$ are constant but it is necessary to know which plane to use for a given image pixel m'. In a preferred exemplary embodiment, the Jacobian $$\frac{\partial H_\pi^{-1}}{\partial p}$$

for all triangles in the three-dimensional mesh may be computed and then the appropriate Jacobian for a given pixel may be used, based on the Z-buffer 140. Additionally, the Jacobian of H may be computed with the following:

$$\frac{\partial H}{\partial p} = \frac{\partial M}{\partial p} Q_\pi \qquad \text{(Equation 15)}$$

The alignment algorithm may be initialized by specifying select correspondences between the camera image 100 and the template 110. For example, four point or line correspondences may be specified. A ground plane to image plane homography $\hat{H}$ may be estimated using a direct linear transformation algorithm and ensuring the cheirality of the estimated matrix is correct. Initial values for the seven projective parameters described with reference to Equation 8 are extracted from $\hat{H}$ by estimating the camera's intrinsic K and extrinsic R[I|−C] matrices. The lens parameters of Equation 4 are initialized to zero which corresponds to ideal pinhole projection.

To determine the intrinsic parameters of the camera, a natural camera with a known principal point may be used so that the image of the absolute conic (IAC) $w = K^{-T}K^{-1}$ has one degree of freedom, the focal length f. The metric ground plane to image plane homography H must satisfy two conditions with respect to the IAC:

$$h_1^T \omega h_1^T - h_2^T \omega h_2 = 0 \qquad \text{(Equation 16)}$$

$$h_1^T \omega h_2 = 0 \qquad \text{(Equation 17)}$$

Where $h_i$ represents the $i^{th}$ column of H. Therefore, given a metric homography (such as the one estimated via the direct linear transformation), K may be computed (and therefore f) from the above system of over determined equations.

To determine the extrinsic parameters of the camera, the non-perspective components of the homography of Equation 6 may be recovered by left multiplying H by $K^{-1}$.

$$H' \cong K^{-1}H \cong R\begin{bmatrix} 1 & 0 & -C_x \\ 0 & 1 & -C_y \\ 0 & 0 & -C_z \end{bmatrix} \qquad \text{(Equation 18)}$$

The first two normalized columns of H' will correspond to the first two columns of R. Subsequently, the camera's orientation may be estimated.

$$R \approx [\hat{h}_1{}' \; \hat{h}_2{}' \; \hat{h}_1{}' \times \hat{h}_2{}'] \qquad \text{(Equation 19)}$$

The closest true orthonormal matrix using singular value decomposition may be found. Once R has been estimated, C may be recovered from the third column of H and the Rodrigues vector $\omega$ from R.

The ground to image plane homography from Equation 6 extracted from the natural camera projection matrix P may be significantly different from the unconstrained homography initially estimated via the direct linear transformation. As a final initialization step, the projective warp parameters $p_H$ of Equation 8 using Levenberg-Marquardt to ensure the homography H extracted from the projection matrix is as close as possible to the initial homography $\hat{H}$, with both matrices scaled to have unit Frobenius norm.

Figure 3:
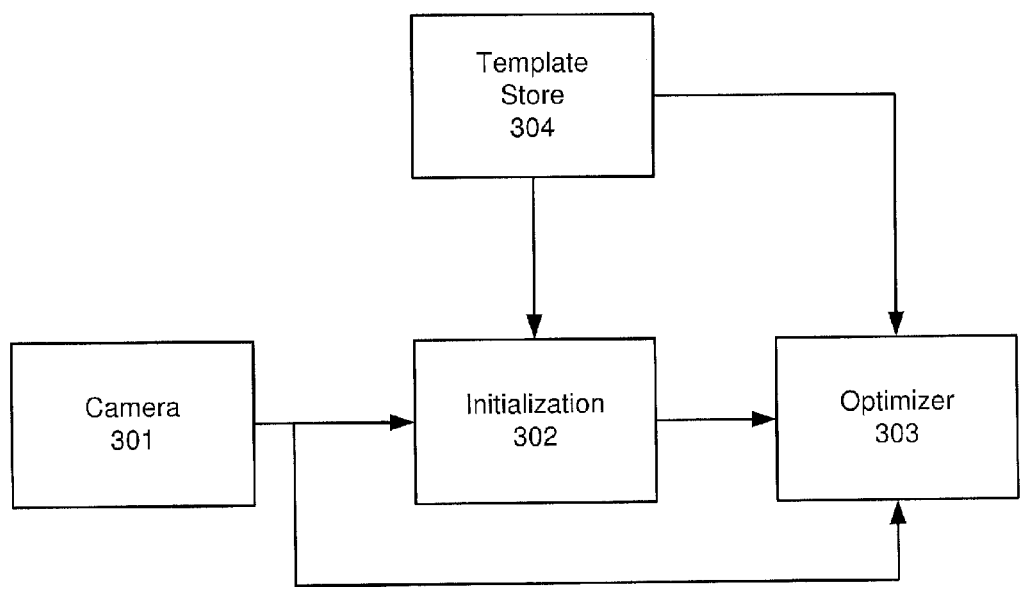
FIG. 3 shows a diagram of an exemplary system for implementing the exemplary long range gradient process according to an exemplary embodiment of the present invention.

FIG. 3 shows a diagram of a system 300 for implementing the long range gradient process discussed above in accordance with some exemplary embodiments. A camera 301 may supply to an initialization module 302 an image 100 taken from a first perspective and containing a first set of non-point landmark features. The initialization module 302 may also receive from storage 304 (or from an external source) a template 110 that includes the first set of non-point landmark features. The template 110 may relate to a second perspective such as an overhead perspective. Thus, if the image is of a field hockey field, the retrieved template will be that of a field hockey field taken from the overhead perspective. The initialization module 302 may identify a plurality of correspondences (e.g., corresponding edges) between the image and the template, and based on these determinations, the initialization module 302 may compute a homography from which an initial set of camera parameters is eventually extracted. The initialization module 302 may further receive from storage 304 a manifold structure 130 that includes a mesh of planar patches. The individual mapping of each pixel location in the image plane to the template may be determined by obtaining the appropriate triangle by using both pixel location and current camera parameters.

The image may also be supplied to an optimizer module 303. The optimizer module 303 may be supplied as well with the template 110. Furthermore, an initial set of camera parameters determined by the initialization module 302 may be provided to the optimizer module 303 including the correspondences between the image pixels and the planar patches of the manifold of the planar pattern 130. The optimizer module 303 may be configured to warp the template 110 to the camera image 100 on the basis of the initial camera parameters in a substantially similar manner as discussed above. The optimizer module 303 may further refine the correlation between the planar pattern 130 with the image 100. The warping may produce an error image that includes one or more non-zero differences between the warped template 110 and image 100. The system may carry out the long range gradient operation as discussed above on the basis of these non-zero differences to determine adjustments (i.e., $\Delta p$) to the camera parameters. Based on the size of the gradient window (which may be pre-set or adjusted automatically depending on the rate of template-image convergence), the optimizer module 303 may calculate at least one long range gradient. The initial camera parameters may be updated by the optimizer module 303 based on the result of the long range gradient. For example, new camera parameters may be derived from the gradient by applying the Lucas-Kanade algorithm discussed above. An alignment check may then be performed in which the template 110 is warped again into the image 100 but this time on the basis of the updated camera parameters to determine how closely the image 100 and template 110 are converging based on the new parameters.

If the convergence does not satisfy a predetermined alignment criterion (e.g., sum of squared per-pixel differences between image 100 and warped template 110), a new long range gradient, based on a new gradient window value, may be performed to serve as the basis for another updated set of camera parameters. For example, if the long range gradient is performed as a contracting long range gradient, the first long range gradient may be performed based on a maximum window value, and subsequent long range gradients may be performed based on smaller window values n (with reference to FIG. 2). Each long range gradient calculation may produce a new updated set of parameters and each new set may be used as the basis for a new warping of the template 110 into the image 100 to determine convergence. The repeating process of gradient determinations (and checking for template-image convergence by performing a warping for each newly generated camera parameter set) may be carried out, until the alignment criterion is met.

Alternatively, a predetermined number of long range gradient operations may be carried out consecutively, without performing an alignment check after every gradient calculation, so that only the set of updated camera parameters produced by the final gradient operation iteration is used to calibrate the camera. The difference between these two approaches is that in the case where an alignment check is performed after every gradient calculation, the gradient calculation will stop whenever the alignment criterion is met, which allows for a variable number of gradient calculations to be performed. On the other hand, the alternative mode of performing a long range gradient operation will always perform a pre-set number of gradient calculations based on a sequence of gradient window values.

For the case where the camera to be calibrated has square pixels and a known principal point, the determination of camera parameters according to the method of the present application is equivalent to calibrating the camera.

Figure 4:
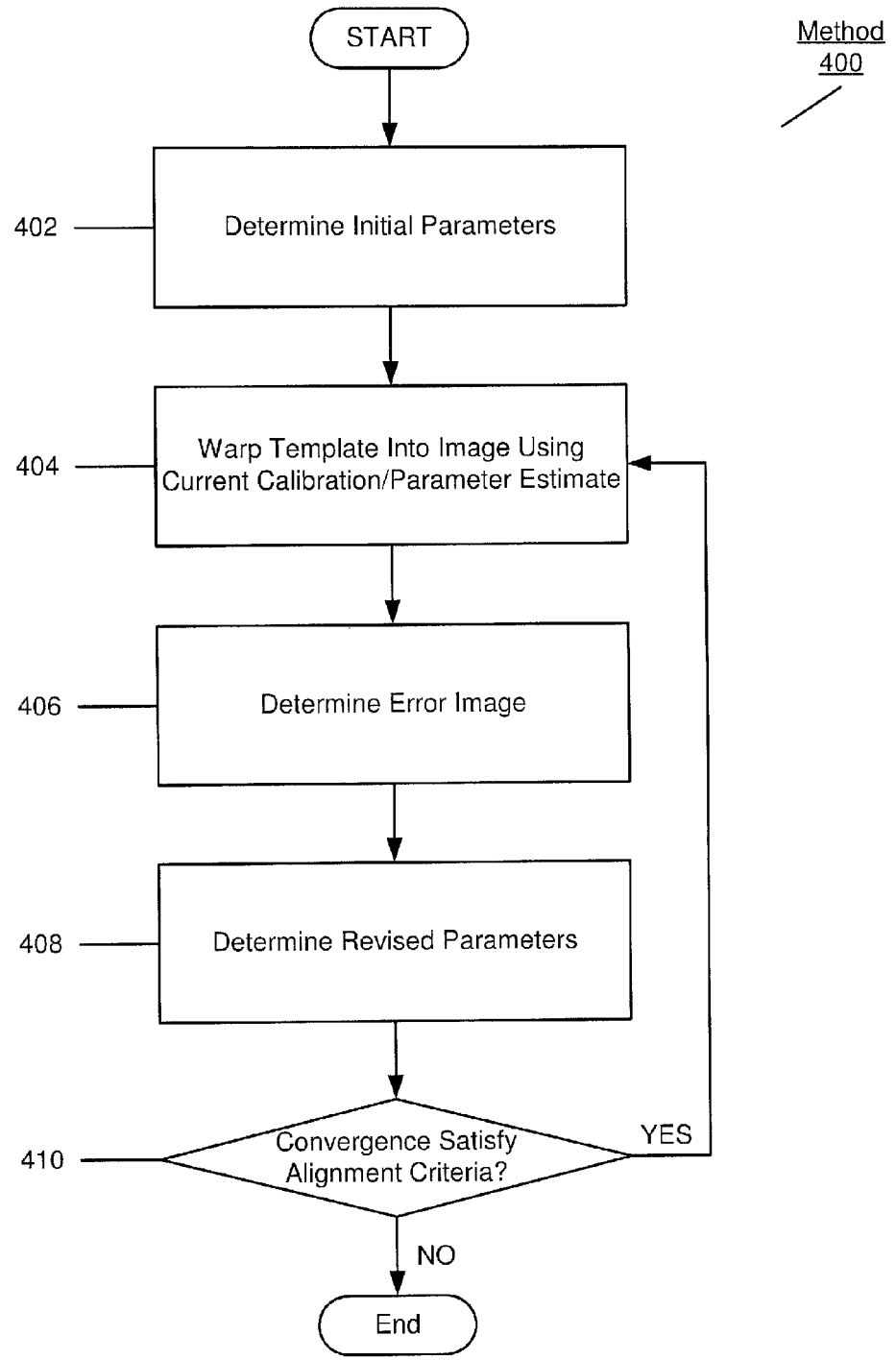
FIG. 4 shows a flow chart illustrating an operation of the exemplary camera calibration operation according to an exemplary embodiment of the present invention.

FIG. 4 shows a flow chart 400 illustrating an operation of the camera calibration operation in accordance with some exemplary embodiments. In step 402, an initial set of camera parameters may be determined. As explained above, the initial set of camera parameters may be determined by calculating a homography based on a plurality of correspondences between a camera image 100 and a template 110. Once the initial set of camera parameters have been determined, in step 404, the template 110 is warped into the camera image 100 using current calibration or parameter estimates. At this point, the initial parameters determined in step 402 may be used for the warping. In step 406, the error image is determined. That is, a difference image between the edge image extracted from camera image 100 and warped template 110 is determined. In step 408, the revised parameters may be determined using the warp Jacobian and long range gradients as discussed above. If an edge warps to a location in camera image 100 that is displaced from the true location of the edge in the camera image, and that displacement is within a predetermined pixel window, the long range gradient at this location may be calculated. The result of the gradient calculation may be used to adjust the initial camera parameters in order to generate the new set of camera parameters in step 408. Thus, in step 410, a determination is made whether the convergence satisfies the alignment criterion. If the convergence of the error image does satisfy the alignment criterion, the method 400 ends with the revised parameters determined in step 408 being generated as the camera parameters for intrinsic, extrinsic, and lens distortion parameters. However, if the convergence does not satisfy the alignment criterion, the method 400 returns to step 404. In step 404, the template image 110 is warped into the camera image 100 using the revised parameters determined in step 408.

As discussed above, the calibration technique of the present application is applicable to non-planar world surfaces. As such, when relating to a single camera, the calibration technique may relate to a limited translation of the camera in which to determine the camera parameters p. That is, the camera is capable of moving in a predetermined trajectory. In a first example, the camera may be stationary (e.g., on a stationary tripod) in which there is zero degrees of freedom and a rotation is only allowed. In a second example, the camera may be at a fixed height moving along a track in which there is one degree of freedom. In a third example, the camera may be at varying heights moving along the track in which there is two degrees of freedom.

The exemplary embodiments further extend its calibration techniques to pairs of cameras that have a correlation between some calibration parameters such as with a three-dimensional rig support. Therefore, as will be discussed in further detail below, the calibration technique may relate to an unconstrained movement in which there are three degrees of freedom but the cameras are coupled in a manner that the camera parameters may be determined for both cameras.

The camera projection matrix $P=K[R|t]$ combines two operators. The extrinsic component $[R|t]$ transforms a point M from the world coordinate system to the camera coordinate system (where the center of projection is at the origin and the camera looks along $+\hat{Z}$). The intrinsic parameters K then project $M^{cam}$ onto the image plane. The pair of cameras may be denoted as $P^{left}$ and $P^{right}$. The cameras may be attached to a rig such that their extrinsic parameters are partially correlated. Most three-dimensional camera rigs have two parameters: interaxial distance d and convergence angle $\varphi$. A new "rig coordinate system" may be defined to express the left and right camera coordinate systems with respect to the rig and the two rig parameters. Specifically, the extrinsics of the left and right cameras may be expressed relative to the coordinate system of the rig. Each camera is located at $\pm d$ along the $\hat{X}$ axis. Both cameras are rotated inwards by $\varphi$. The rotation is defined relative to the $+\hat{Y}$ axis, which means the left camera is rotated by $+\varphi$ and the right camera by $-\varphi$. In the rig coordinate system, the left camera is located at $$C^{left} = \left[-\frac{1}{2}d, 0, 0\right]^T$$

and the right camera at $$C^{right} = \left[+\frac{1}{2}d, 0, 0\right]^T.$$

The left camera is panned by $+\varphi$ and the right camera by $-\varphi$. Thus, the extrinsic camera component R for each camera may be computed.

$$R^{left} = \begin{bmatrix} \cos\phi & 0 & -\sin\phi \\ 0 & 1 & 0 \\ \sin\phi & 0 & \cos\phi \end{bmatrix} \quad \text{(Equation 20)}$$

$$R^{right} = \begin{bmatrix} \cos\phi & 0 & \sin\phi \\ 0 & 1 & 0 \\ -\sin\phi & 0 & \cos\phi \end{bmatrix} \quad \text{(Equation 21)}$$

The rig determines the extrinsic parameters of the left and right cameras. As a result, the individual camera projection matrices may be written with the following:

$$P^{left}=K^{left}R^{left}[I|-C^{left}]R^{rig}[I|-C^{rig}] \quad \text{(Equation 22)}$$

$$P^{right}=K^{right}R^{right}[I|-C^{right}]R^{rig}[I|-C^{rig}] \quad \text{(Equation 23)}$$

It should be noted that the above equations include matrix dimensions that do not agree for proper multiplication. Conventionally, the rotation and translation matrices must be written as 4×4 matrices achieved with appropriate padding of 0s and 1s. The resulting extrinsic matrix will have a bottom row of [0 0 0 1], which may be omitted, making the typical 3×4 matrix [R|t].

The projection matrices for the left camera and the right camera may be computed. Focusing on the left camera only, the following computations may be made.

$$P^{left} = K^{left} R^{left} [I | -C^{left}] R^{rig} [I | -C^{rig}] \quad \text{(Equation 24)}$$

$$P^{left} = K^{left} \begin{bmatrix} \cos\phi & 0 & -\sin\phi & 0 \\ 0 & 1 & 0 & 0 \\ \sin\phi & 0 & \cos\phi & 0 \\ 0 & 0 & 0 & 1 \end{bmatrix} \begin{bmatrix} 1 & 0 & 0 & \frac{d}{2} \\ 0 & 1 & 0 & 0 \\ 0 & 0 & 1 & 0 \\ 0 & 0 & 0 & 1 \end{bmatrix} \quad \text{(Equation 25)}$$

$$R^{rig} \begin{bmatrix} 1 & 0 & 0 & -C_X^{rig} \\ 0 & 1 & 0 & -C_Y^{rig} \\ 0 & 0 & 1 & -C_Z^{rig} \\ 0 & 0 & 0 & 1 \end{bmatrix}$$

$$P^{left} = \quad \text{(Equation 26)}$$

$$K^{left} \begin{bmatrix} \cos\phi & 0 & -\sin\phi & \frac{d}{2}\cos\phi \\ 0 & 1 & 0 & 0 \\ \sin\phi & 0 & \cos\phi & \frac{d}{2}\sin\phi \\ 0 & 0 & 0 & 1 \end{bmatrix} \begin{bmatrix} R_{00}^{rig} & R_{01}^{rig} & R_{02}^{rig} & t_X^{rig} \\ R_{10}^{rig} & R_{11}^{rig} & R_{12}^{rig} & t_Y^{rig} \\ R_{20}^{rig} & R_{21}^{rig} & R_{22}^{rig} & t_Z^{rig} \\ 0 & 0 & 0 & 1 \end{bmatrix}$$

$$P^{left} = \quad \text{(Equation 27)}$$

$$K^{left} \begin{bmatrix} \cos\phi R_{00}^{rig} - & \cos\phi R_{01}^{rig} - & \cos\phi R_{02}^{rig} - & \cos\phi\left(t_X^{rig} + \frac{d}{2}\right) - \\ \sin\phi R_{20}^{rig} & \sin\phi R_{21}^{rig} & \sin\phi R_{22}^{rig} & \sin\phi t_Z^{rig} \\ R_{10}^{rig} & R_{11}^{rig} & R_{12}^{rig} & t_Y^{rig} \\ \sin\phi R_{00}^{rig} + & \sin\phi R_{01}^{rig} + & \sin\phi R_{02}^{rig} + & \sin\phi\left(t_X^{rig} + \frac{d}{2}\right) + \\ \cos\phi R_{20}^{rig} & \cos\phi R_{21}^{rig} & \cos\phi R_{22}^{rig} & \cos\phi t_Z^{rig} \\ 0 & 0 & 0 & 1 \end{bmatrix}$$

$$P^{left} = K^{left}[R | t]^{left} \quad \text{(Equation 28)}$$

Using substantially similar computations as performed for the left camera, the projection matrix for the right camera may also be computed.

$$P^{right} = \quad \text{(Equation 29)}$$

$$\begin{bmatrix} \cos\phi R_{00}^{rig} + & \cos\phi R_{01}^{rig} + & \cos\phi R_{02}^{rig} + & \cos\phi\left(t_X^{rig} - \frac{d}{2}\right) + \\ \sin\phi R_{20}^{rig} & \sin\phi R_{21}^{rig} & \sin\phi R_{22}^{rig} & \sin\phi t_Z^{rig} \\ R_{10}^{rig} & R_{11}^{rig} & R_{12}^{rig} & t_Y^{rig} \\ -\sin\phi R_{00}^{rig} + & -\sin\phi R_{01}^{rig} + & -\sin\phi R_{02}^{rig} + & -\sin\phi\left(t_X^{rig} + \frac{d}{2}\right) + \\ \cos\phi R_{20}^{rig} & \cos\phi R_{21}^{rig} & \cos\phi R_{22}^{rig} & \cos\phi t_Z^{rig} \\ 0 & 0 & 0 & 1 \end{bmatrix}$$

When the calibration surface is not the ground plane, the mapping to the arbitrary plane $\pi$ must be included.

$$m \to m' = P^{left/right} \begin{bmatrix} \hat{i}_X & \hat{j}_X & 0 \\ \hat{i}_Y & \hat{j}_Y & 0 \\ \hat{i}_Z & \hat{j}_Z & -\frac{d_\pi}{c_\pi} \\ 0 & 0 & 1 \end{bmatrix} \begin{bmatrix} i \\ j \\ 1 \end{bmatrix} \quad \text{(Equation 30)}$$

$$m \to m' = \quad \text{(Equation 31)}$$

$$\begin{bmatrix} P_{00}\hat{i}_X + P_{01}\hat{i}_Y + P_{02}\hat{i}_Z & P_{00}\hat{j}_X + P_{01}\hat{j}_Y + P_{02}\hat{j}_Z & -P_{02}\frac{d_\pi}{c_\pi} + P_{03} \\ P_{10}\hat{i}_X + P_{11}\hat{i}_Y + P_{12}\hat{i}_Z & P_{10}\hat{j}_X + P_{11}\hat{j}_Y + P_{12}\hat{j}_Z & -P_{12}\frac{d_\pi}{c_\pi} + P_{13} \\ P_{20}\hat{i}_X + P_{21}\hat{i}_Y + P_{22}\hat{i}_Z & P_{20}\hat{j}_X + P_{21}\hat{j}_Y + P_{22}\hat{j}_Z & -P_{22}\frac{d_\pi}{c_\pi} + P_{23} \end{bmatrix}$$

$$\begin{bmatrix} i \\ j \\ 1 \end{bmatrix}$$

$$m \to m' = H_\pi^{left/right} \begin{bmatrix} i \\ j \\ 1 \end{bmatrix} \quad \text{(Equation 32)}$$

For a given set of stereo camera parameters $p=[f^{left}, f^{right}, C_X^{rig}, C_Y^{rig}, C_Z^{rig}, w_1^{rig}, w_2^{rig}, w_3^{rig}, \varphi, d]^T$, the regular forwards additive alignment algorithm may be used with only slight modification. Here, error images, gradients, Jacobians, and steepest descent images are computed for both the left and right images. However, both the Hessian and incremental parameter update $\Delta p$ are computed by iterating over all pixels in both images.

The Jacobian of the stereo pair is computed in a similar fashion to that of a single camera. The main difference is that the partial derivatives of both $H_\pi^{left}$ and $H_\pi^{right}$ must be computed and the set of parameters is entirely different. From Equation 32, it is clear that any element in $$\frac{\partial H_\pi^{left/right}}{\partial p}$$

directly depends on $$\frac{\partial P^{left/right}}{\partial p}$$

(as the parameters of plane $\pi$ are constant). As a result, the derivative of P may be computed for an arbitrary parameter p. From Equation 27, the following may be computed:

$$\frac{\partial p^{left}}{\partial f^{left}} = \quad \text{(Equation 33)}$$

$$\begin{bmatrix} \cos\phi R_{00}^{rig} - & \cos\phi R_{01}^{rig} - & \cos\phi R_{02}^{rig} - & \cos\phi\left(t_X^{rig} + \frac{d}{2}\right) - \\ \sin\phi R_{20}^{rig} & \sin\phi R_{21}^{rig} & \sin\phi R_{22}^{rig} & \sin\phi t_Z^{rig} \\ R_{10}^{rig} & R_{11}^{rig} & R_{12}^{rig} & t_Y^{rig} \\ 0 & 0 & 0 & 0 \end{bmatrix}$$

$$\frac{\partial P^{left}}{\partial f^{right}} = 0 \quad \text{(Equation 34)}$$

-continued $$\frac{\partial P^{left}}{\partial C_X^{rig}} = \begin{bmatrix} 0 & 0 & 0 & -f^{left}\cos\phi R_{00}^{rig} + f^{left}\sin\phi R_{20}^{rig} - \\ & & & e_x\sin\phi R_{00}^{rig} - e_x\cos\phi R_{20}^{rig} \\ 0 & 0 & 0 & -f^{left}R_{10}^{rig} - e_y\sin\phi R_{00}^{rig} - e_y\cos\phi R_{20}^{rig} \\ 0 & 0 & 0 & -\sin\phi R_{00}^{rig} - \cos\phi R_{20}^{rig} \end{bmatrix}$$ (Equation 35)

$$\frac{\partial P^{left}}{\partial C_Y^{rig}} = \begin{bmatrix} 0 & 0 & 0 & -f^{left}\cos\phi R_{01}^{rig} + f^{left}\sin\phi R_{21}^{rig} - \\ & & & e_x\sin\phi R_{01}^{rig} - e_x\cos\phi R_{21}^{rig} \\ 0 & 0 & 0 & -f^{left}R_{11}^{rig} - e_y\sin\phi R_{01}^{rig} - e_y\cos\phi R_{21}^{rig} \\ 0 & 0 & 0 & -\sin\phi R_{01}^{rig} - \cos\phi R_{21}^{rig} \end{bmatrix}$$ (Equation 36)

$$\frac{\partial P^{left}}{\partial C_Z^{rig}} = \begin{bmatrix} 0 & 0 & 0 & -f^{left}\cos\phi R_{02}^{rig} + f^{left}\sin\phi R_{22}^{rig} - \\ & & & e_x\sin\phi R_{02}^{rig} - e_x\cos\phi R_{22}^{rig} \\ 0 & 0 & 0 & -f^{left}R_{12}^{rig} - e_y\sin\phi R_{02}^{rig} - e_y\cos\phi R_{22}^{rig} \\ 0 & 0 & 0 & -\sin\phi R_{02}^{rig} - \cos\phi R_{22}^{rig} \end{bmatrix}$$ (Equation 37)

First Column:

$$\frac{\partial P_0^{left}}{\partial \phi} =$$ (Equation 38)

$$\begin{bmatrix} f^{left}(-\sin\phi R_{00}^{rig} - \cos\phi R_{20}^{rig}) + e_x(\cos\phi R_{00}^{rig} - \sin\phi R_{20}^{rig}) \\ e_y(\cos\phi R_{00}^{rig} - \sin\phi R_{20}^{rig}) \\ \cos\phi R_{00}^{rig} - \sin\phi R_{20}^{rig} \end{bmatrix}$$

Second Column:

$$\frac{\partial P_1^{left}}{\partial \phi} =$$ (Equation 39)

$$\begin{bmatrix} f^{left}(-\sin\phi R_{01}^{rig} - \cos\phi R_{21}^{rig}) + e_x(\cos\phi R_{01}^{rig} - \sin\phi R_{21}^{rig}) \\ e_y(\cos\phi R_{01}^{rig} - \sin\phi R_{21}^{rig}) \\ \cos\phi R_{01}^{rig} - \sin\phi R_{21}^{rig} \end{bmatrix}$$

Third Column:

$$\frac{\partial P_2^{left}}{\partial \phi} =$$ (Equation 40)

$$\begin{bmatrix} f^{left}(-\sin\phi R_{02}^{rig} - \cos\phi R_{22}^{rig}) + e_x(\cos\phi R_{02}^{rig} - \sin\phi R_{22}^{rig}) \\ e_y(\cos\phi R_{02}^{rig} - \sin\phi R_{22}^{rig}) \\ \cos\phi R_{02}^{rig} - \sin\phi R_{22}^{rig} \end{bmatrix}$$

Fourth Column:

$$\frac{\partial P_3^{left}}{\partial \phi} = \begin{bmatrix} -f^{left}\sin\phi\left(t_x^{rig} + \frac{d}{2}\right) - f^{left}\cos\phi t_z^{rig} + \\ e_x\cos\phi\left(t_x^{rig} + \frac{d}{2}\right)e_x\sin\phi t_z^{rig} \\ e_y\cos\phi\left(t_x^{rig} + \frac{d}{2}\right) - e_y\sin\phi t_z^{rig} \\ \cos\phi\left(t_x^{rig} + \frac{d}{2}\right) - \sin\phi t_z^{rig} \end{bmatrix}$$ (Equation 41)

$$\frac{\partial P^{left}}{\partial d} = \begin{bmatrix} 0 & 0 & 0 & \frac{1}{2}(f^{left}\cos\phi + e_x\sin\phi) \\ 0 & 0 & 0 & \frac{1}{2}e_y\sin\phi \\ 0 & 0 & 0 & \frac{1}{2}\sin\phi \end{bmatrix}$$ (Equation 42)

Using the above equations, the initial independent camera calibrations from four points may be used to estimate the initial position of the rig for a typical interaxial distance such as 2.5 in. The constrained projection matrices are often quite different from the independent estimations. As a result, the calibration may be divided into two states: re-estimating only the extrinsic properties of the rig (position and orientation), followed by a full re-estimation of all parameters (such as interaxial distance).

In a specific example, the above equations were used to provide the following parameter values.

|  | f [pixels] | C [ft] | w [rads] | d [in] |
|---|---|---|---|---|
| Initial | 3691.08 | [118.625, | [1.69858, | 2.5 |
|  | 3682.28 | −38.4138, | −0.31464, |  |
|  |  | 21.9059] | 0.26586] |  |
| Revised | 3694.63 | [117.741, | [1.70411, | 2.5 |
|  | 3680.97 | −37.2997, | −0.316361, |  |
|  |  | 23.0248] | 0.27565] |  |
| Final | 3695.45 | [117.706, | [1.70418, | 4.575504 |
|  | 3680.15 | −37.3182, | −0.31621, |  |
|  |  | 23.0355] | 0.275525] |  |

It should be noted that the above method has been discussed in connection with the use of sporting fields to serve as the non-point landmarks for achieving camera calibration. Nevertheless, the exemplary embodiments of the present invention is not limited to sporting fields but is instead compatible with non-point landmark features that are present in other categories of images. For example, in the field of surveillance, cameras to be used for surveillance must be calibrated with regard to the environment that is to be monitored. A camera may be mounted on or near a highway for the purpose of monitoring traffic conditions, or providing law enforcement and rescue professionals with images of accidents occurring on a particular segment of the highway. In that case, the non-point landmark features would correspond to lane markings and highway shoulder lines, for example. The overhead template for a highway segment may be obtained, for instance, from satellite images.

Those skilled in the art will understand that the above described exemplary embodiments may be implemented in any number of manners, including, as a separate software module, as a combination of hardware and software, etc. For example, the above described iterative process may be a program containing lines of code that, when compiled, may be executed on a processor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
receiving a camera image captured by a camera and a set of parameter values that models a perspective of the camera;
receiving a synthetically generated planar template pattern embedded on a surface and a 3D geometry of the surface, wherein the planar template pattern is a representation of a sporting field;
calculating a long range gradient of the planar template pattern,
wherein the long range gradient of the planar template pattern is based on a calculation within a gradient window;
warping the planar template pattern into the perspective of the camera based on the set of the parameter values to generate a warped template image;
generating an error image based on a comparison between the camera image and the warped template image; and
computing an adjusted set of parameter values to reduce an error associated with the error image, wherein the computing is based on the long range gradient.

2. The method of claim 1, further comprising:
(a) warping the planar template pattern into the perspective of the camera based on the adjusted set of parameter values to generate a further warped template image;
(b) generating a further error image based on a comparison between the camera image and the further warped template image; and
(c) computing a further adjusted set of parameter values to further reduce an error associated with the further error image, wherein the computing is based on a further long range gradient.

3. The method of claim 2, wherein steps (a)-(c) are repeated until a predetermined, terminating criterion is reached.

4. The method of claim 1, further comprising:
filtering the camera image to identify pixels that correspond to the planar template pattern.

5. The method of claim 1, wherein the 3D geometry is a planar surface.

6. The method of claim 1, wherein the set of parameters values includes intrinsic property values and extrinsic property values of the camera.

7. The method of claim 1, wherein the set of parameter values includes properties of a lens.

8. The method of claim 7, wherein the properties of the lens are functions of a focal length.

9. The method of claim 1, wherein the set of parameter values includes auxiliary parameter values that represent correlated properties between the camera and at least one other camera.

10. The method of claim 1, wherein the set of parameter values describes a limited configuration, the limited configuration comprising one or more properties of the camera or the camera and at least one other camera having predetermined values.

11. The method of claim 1, wherein the camera image is a temporal sequence of images, the set of parameter values are a temporal sequence of values, and the adjusting minimizes the rate of change of the temporal sequence of values over time.

12. The method of claim 1, further comprising:
calibrating the camera generating the camera image as a function of the adjusted parameter values.

13. The method of claim 1, wherein the calculation of the measure of the gradient window includes:
a selection of an initial window size, and
a performance of a coarse to fine alignment on the initial window size.

14. The method of claim 1, wherein the error image includes displacement data corresponding to at least one difference between the camera image and the warped template image and wherein the long range gradient of the planar template pattern is calculated at a location based on the displacement data.

15. A system, comprising:
an image capturing device configured to generate a camera image;
a memory arrangement configured to store the camera image, a synthetically generated planar template pattern that is a representation of a sporting field embedded on a surface, a 3D geometry of the surface, and a set of parameter values that models a perspective of the image capturing device; and
a processor configured to warp the planar template pattern into the perspective of the image capturing device based on the set of parameter values to generate a warped template image,
the processor configured to calculate a long range gradient of the planar template pattern,
wherein the long range gradient of the planar template pattern is based on a calculation within a gradient window,
the processor configured to generate an error image based on a comparison between the camera image and the warped template image,
the processor configured to compute an adjusted set of parameter values to reduce an error associated with the error image, wherein the computing is based on the long range gradient.

16. The system of claim 15, wherein,
the processor is configured to warp the planar template pattern into the perspective of the image capturing device based on the adjusted set of parameter values to generate a further warped template image,
the processor is configured to generate a further error image based on a comparison between the camera image and the further warped template image,
the processor is configured to compute a further set of adjusted parameter values to further reduce an error associated with the further error image, wherein the computing is based on a further long range gradient.

17. The system of claim 15, wherein the processor is further configured to filter the camera image to identify pixels which correspond to the planar template pattern.

18. The system of claim 15, wherein the set of parameter values includes intrinsic property values and extrinsic property values of the image capturing device.

19. The system of claim 15, wherein the set of parameter values includes auxiliary parameters that describe correlated properties between the image capturing device and at least one other image capturing device.

20. The system of claim 15, wherein the set of parameter values describes a limited configuration, the limited configuration comprising one or more properties of the image capturing device or the image capturing device and at least one other image capturing device having predetermined values.

* * * * *

UNITED STATES PATENT AND TRADEMARK OFFICE
CERTIFICATE OF CORRECTION

PATENT NO. : 9,883,163 B2
APPLICATION NO. : 13/737627
DATED : January 30, 2018
INVENTOR(S) : Carr et al.

Page 1 of 1

It is certified that error appears in the above-identified patent and that said Letters Patent is hereby corrected as shown below:

In the Claims

Claim 6, Column 21, Line 43:
"The method of claim 1, wherein the set of parameters" should read "The method of claim 1, wherein the set of parameter".

Signed and Sealed this
Fourth Day of June, 2019

Andrei Iancu
*Director of the United States Patent and Trademark Office*